(12) United States Patent
Muller et al.

(10) Patent No.: US 9,384,361 B2
(45) Date of Patent: *Jul. 5, 2016

(54) DISTRIBUTED EVENT SYSTEM FOR RELATIONAL MODELS

(75) Inventors: Leslie Muller, London (GB); Michael Morris Wasser, Seattle, WA (US); Alberto Arias Maestro, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/635,313

(22) PCT Filed: Mar. 11, 2011

(86) PCT No.: PCT/US2011/028095
§ 371 (c)(1),
(2), (4) Date: Feb. 15, 2013

(87) PCT Pub. No.: WO2011/115833
PCT Pub. Date: Sep. 22, 2011

(65) Prior Publication Data
US 2013/0144852 A1 Jun. 6, 2013

Related U.S. Application Data

(60) Provisional application No. 61/313,951, filed on Mar. 15, 2010.

(51) Int. Cl.
*G06F 17/30* (2006.01)
*G06F 21/62* (2013.01)

(52) U.S. Cl.
CPC ........ *G06F 21/6218* (2013.01); *G06F 17/3051* (2013.01); *G06F 17/30424* (2013.01);
(Continued)

(58) Field of Classification Search
CPC ............... G06F 17/30424; G06F 17/30474; G06F 17/3051; G06F 17/30545; G06F 17/30595; G06F 17/30867; G06F 21/6218; G06F 21/6227
See application file for complete search history.

(56) References Cited

U.S. PATENT DOCUMENTS 6,085,191 A 7/2000 Fisher et al.
6,374,252 B1 4/2002 Althoff et al.
(Continued)

FOREIGN PATENT DOCUMENTS

WO 95/31781 A1 11/1995

OTHER PUBLICATIONS

Notification of Transmittal of the International Search Report and the Written Opinion of the International Searching Authority, or the Declaration; International Search Report and Written Opinion for International Application No. PCT/US2011/020895, Oct. 21, 2011, 7 pgs.

(Continued)

*Primary Examiner* — Shew-Fen Lin (57) ABSTRACT

A distributed event system for a relational database is disclosed. An event data model operatively describes a target database. For a subject entity in the target database, the event data model declares and defines triggering events and respective corresponding operations. An event engine monitors database queries and events involving the subject entity and determines from the event data model corresponding operations. Execution of the determined corresponding operations is distributed to network-based agents. Agents may be filtered based on skills and/or credentials injected at runtime. Code binaries of the operations are downloaded to the agents for execution.

20 Claims, 6 Drawing Sheets

(52) U.S. Cl.
CPC .... *G06F17/30474* (2013.01); *G06F 17/30545* (2013.01); *G06F 17/30595* (2013.01); *G06F 17/30867* (2013.01); *G06F 21/6227* (2013.01)

(56) References Cited

U.S. PATENT DOCUMENTS

| | | | |
|---|---|---|---|
| 6,820,082 B1 * | 11/2004 | Cook | G06F 21/6227 |
| | | | 707/754 |
| 6,928,554 B2 | 8/2005 | Dettinger et al. | |
| 6,985,904 B1 | 1/2006 | Kaluskar et al. | |
| 7,054,877 B2 | 5/2006 | Dettinger et al. | |
| 7,158,969 B2 | 1/2007 | Dettinger et al. | |
| 7,228,307 B2 | 6/2007 | Dettinger et al. | |
| 7,599,924 B2 | 10/2009 | Dettinger et al. | |
| 7,672,936 B2 | 3/2010 | Dettinger et al. | |
| 7,734,639 B2 | 6/2010 | Dettinger et al. | |
| 7,984,043 B1 | 7/2011 | Waas | |
| 8,027,971 B2 | 9/2011 | Dettinger et al. | |
| 8,214,325 B2 | 7/2012 | Navas | |
| 2003/0014394 A1 | 1/2003 | Fujiwara et al. | |
| 2004/0088561 A1 | 5/2004 | Dettinger et al. | |
| 2004/0103433 A1 | 5/2004 | Regeard et al. | |
| 2004/0254924 A1 | 12/2004 | Dettinger et al. | |
| 2005/0038783 A1 | 2/2005 | Lei et al. | |
| 2006/0026159 A1 | 2/2006 | Dettinger et al. | |
| 2006/0248592 A1 | 11/2006 | Agrawal et al. | |
| 2007/0130616 A1 | 6/2007 | Ng et al. | |
| 2007/0180490 A1 * | 8/2007 | Renzi | G06F 21/577 |
| | | | 726/1 |
| 2007/0185853 A1 | 8/2007 | Dettinger et al. | |
| 2007/0208746 A1 * | 9/2007 | Koide | G06F 21/6218 |
| 2007/0288890 A1 * | 12/2007 | Wells | G06F 8/38 |
| | | | 717/113 |
| 2008/0010239 A1 | 1/2008 | Nochta | |
| 2008/0189758 A1 | 8/2008 | Akeel et al. | |
| 2008/0284598 A1 | 11/2008 | Shah | |
| 2009/0006063 A1 | 1/2009 | Sedukhin et al. | |
| 2009/0006352 A1 | 1/2009 | Dettinger et al. | |
| 2009/0055838 A1 | 2/2009 | Sedukhin et al. | |
| 2009/0063490 A1 | 3/2009 | Fuerst et al. | |
| 2009/0300002 A1 | 12/2009 | Thomas et al. | |
| 2010/0023498 A1 | 1/2010 | Dettinger et al. | |
| 2010/0030725 A1 | 2/2010 | Mendis et al. | |
| 2010/0125545 A1 | 5/2010 | Navas | |
| 2011/0302180 A1 | 12/2011 | Muller et al. | |
| 2011/0302200 A1 | 12/2011 | Muller et al. | |
| 2013/0138666 A1 | 5/2013 | Muller et al. | |

OTHER PUBLICATIONS

Notification of Transmittal of the International Search Report and the Written Opinion of the International Searching Authority, or the Declaration; International Search Report and Written Opinion for International Application No. PCT/US2011/028138, Oct. 26, 2011, 9 pgs.

European Patent Office, Supplementary European Search Report and European Search Opinion, App. 11756764.4/EP2548138, 7 pages, Sep. 26, 2013.

* cited by examiner

DISTRIBUTED EVENT SYSTEM FOR RELATIONAL MODELS

RELATED APPLICATIONS

This application is a national stage application under 35 U.S.C. §371 of International Application No. PCT/US2011/028095, filed Mar. 11, 2011, which claims priority to and the benefit under 35 U.S.C. §119(e) of U.S. Provisional Application No. 61/313,951, filed on Mar. 15, 2010, which applications are all incorporated by reference into the present disclosure in their entirety.

The entire teachings of the above application(s) are incorporated herein by reference.

BACKGROUND OF THE INVENTION

Generally in the state of the art, relational database systems only provide security at object/operation level. For example, it is possible to configure which users can read or modify a table, view or store procedure. It is also possible in more advanced database systems to control row level access using views to control access to the data (using role membership functions provided by the database system) and a model to store the association of data labels to roles that can be used to filter the data presented by the view. Those mechanisms present the following problems:

(1) The user or group accessing the database needs to be configured in the database system.

(2) The database system must have physical access to the security store (i.e. LDAP) in order to resolve user group memberships and the state of the account (enabled/disabled).

(3) The identity of the user must be used with or upon connection to the database.

(4) Authentication of users on multi layer systems requires delegation of credentials which is not universally available.

(5) Authenticating every user in the database server prevents the usage of connection pools and therefore degrades performance.

(6) Forcing the database to resolve users, groups and role memberships degrades performance.

(7) Changes on the security roles, requires modification of database objects (i.e. views or store procedures).

Further traditional distributed systems or ordinary centralized systems provide no transparency to the user and lack ability to adapt to complexities of the user and their environment.

SUMMARY OF THE INVENTION

The present invention addresses the shortcomings of the prior art. In particular, embodiments provide a declarative distributed event system for relational data models.

The event system allows the execution of predefined operations upon the creation, modification or deletion of entities on a target relational model. Events can be filtered using conditional statements over the data of the target entity.

In one embodiment, a database method and system comprise:

providing an event data model of a target database, the target database being one of a plurality of unrelated and non-centrally managed databases;

per a subject entity in the target database, using the event data model to declare and define triggering events and respective corresponding operations for each triggering event;

monitoring queries of the target database in a manner detecting occurrence of an event involving the subject entity in the target database;

based on the detected event, determining from the event data model corresponding operations; and distributing execution of the determined corresponding operations. In particular, the distributed execution employs one or more agents. Each agent downloads the respective code binaries of the determined corresponding operation that the agent is executing.

In one embodiment, each agent has a common set of skills. The invention system further annotates the event data model with skills in a manner that enables respective filtering of agents for executing different operations.

In accordance with another aspect of the present invention, different agents have different credentials. An event engine of the invention system injects credentials per operation at runtime. An event runtime subsystem of the event engine posts the pending operations for agents to obtain on a first come, first served basis in some embodiments.

In accordance with other aspects, the event engine monitoring and detecting occurrence of an event involving the subject entity includes a security runtime subsystem. The security runtime subsystem intercepts a query of the target database and identifies the subject entity as part of the query. The security runtime subsystem then cross-references events and corresponding operations in the event data model for the subject entity as identified.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The teachings of all patents, published applications and references cited herein are incorporated by reference in their entirety.

Figure 1:
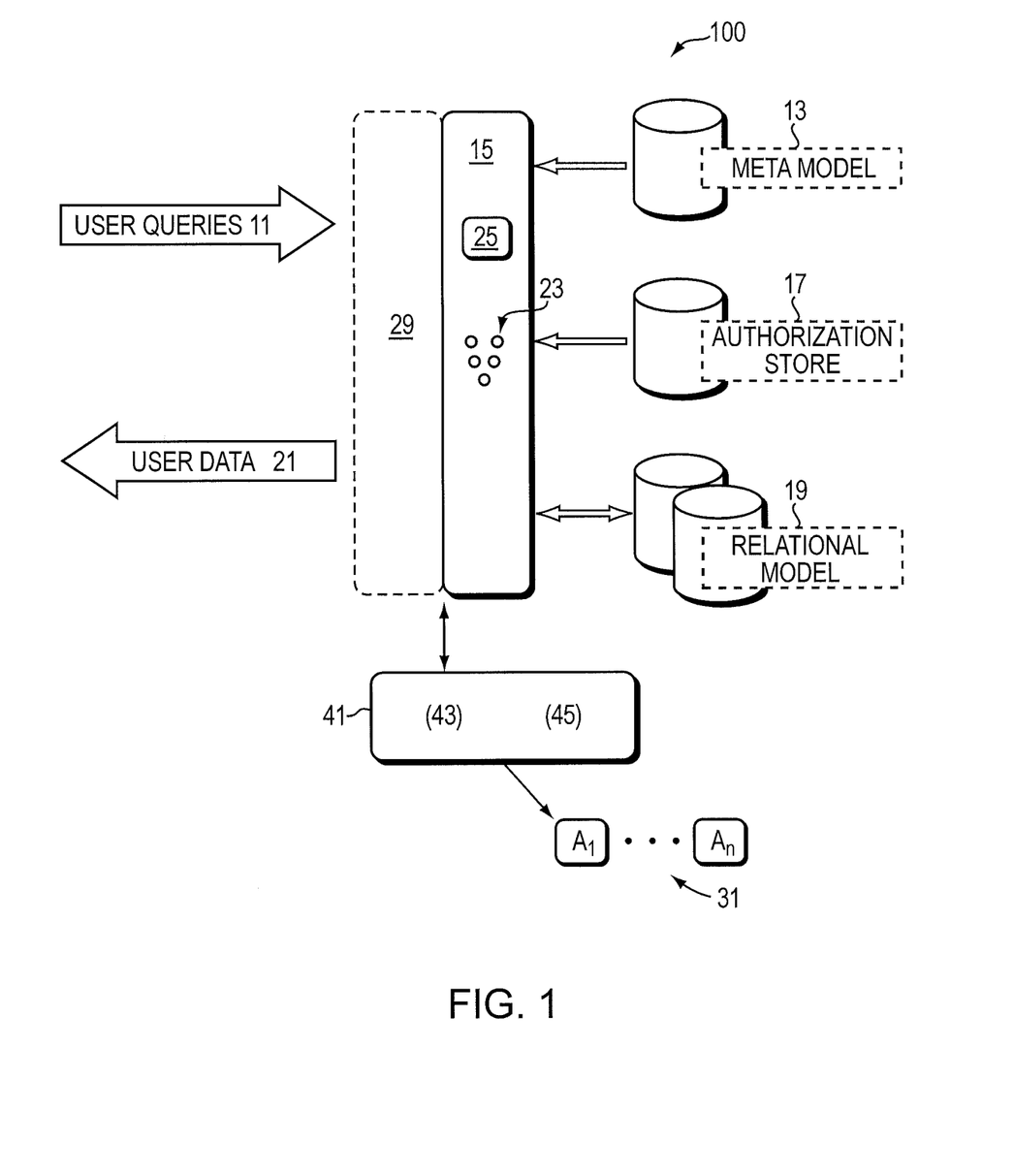
FIG. 1 is a block diagram of an embodiment of the present invention.

The diagram of FIG. 1 represents the components of one embodiment of the present invention. The illustrated system 100 provides and implements a declarative distributed event system for relational data models or a target database system 19. Systems 100 embodying the present invention may operate on or otherwise apply to a plurality of relational models/databases 19 at a time. The databases 19 are unrelated to each other and non-centrally managed. The illustrated non-limiting, example system 100 comprises:

(1) a repository 15 storing models 23 of the target databases 19;

(2) a model manager 25 defining and managing models 23;

(3) a distributed event engine 41 that at run time manages different types of events and associates them with the execution of one or more workflows; and (4) a web service interface 29 that presents to users representations of the models 23.

The repository 15 comprises: (1) a plurality of models 23 and (2) a model manager 25. The plurality of models 23 includes custom models along with system standard models. Each model 23 is formed of data models representative of a target database 19, business logic, event triggers and functions, security definitions and distribution configurations. Each of these elements that are part of a model 23 can be created, modified, and injected into the model manager 25/repository 15. The model manager 25 manages these elements per model 23 and groups these elements into a model 23.

For a given model 23, its data model defines entities, attributes and relationships, such as tables and sub-tables and organization of the tables/sub-tables of the target database 19. Security configurations can be defined at each logical level (table element, sub-table element, table part or whole, sub-table part or whole).

Custom business logic can be easily written composing workflows from a library of existing activities that include integrations with external systems, and utilities for data and model management. System 100 can associate a different custom task for each read, write and delete operation on any data element in a subject model 23. For example, system 100 can execute workflow "A" every time a new request is submitted, or execute workflow "B" every time a virtual machine is deleted.

Defining, modifying or updating part of a model 23, injecting new models 23 into the model manager 25/repository 15 or updating old ones is a simple configuration task in system 100 that requires no coding or compilation, and can be performed while an instance of repository 15 is running. For each model 23, the system 100 defines in model manager 25/repository 15 the model's data and business logic and specifies in model manager 25 the model's security, event and distribution configurations. This enables the model manager 25 and repository 15 to govern who, when and where business logic is executed and data is accessed.

In one embodiment, the governance structure of repository 15 can tailor and control how services are provided and customized for specific users, groups and organizations. By services, Applicant's refer to virtual machines, desk tops, physical servers, and in general any infrastructure, platform or software managed by the system 100 within a private or public cloud.

Repository's 15 governance structure controls aspects of a custom solution that integrates with an external database/relational model 19 system. In particular, repository's 15 governance controls:

the creation, access and modification of existing or new data, either inside repository 15 or using an external database or system;

the definition of custom business logic that is executed in a distributed scalable environment;

the configuration of the rules that specify when the business logic is executed; and the configuration of the rules that specify where the business logic is executed.

A new data model (at 23) can be defined in two ways:

(i) connecting to an existing external database 19 and selecting the subset of the data or the entire database 19.

(ii) creating new data from scratch specifying new entities, attributes and relationships.

The data model and corresponding model 23 can then be injected into the model manager 25 and the repository 15, and in turn the model manager 25 automatically generates a REST interface 29 (or the like web service interface). Unlike a typical REST interface 29 that exposes the entire contents of a URI (Uniform Resource Identifier, identifying a resource on the internet), system's 100 automatically generated REST interface 29 exposes only selected parts to the data using access permissions, rules and filters that can easily support complex conditions. This is accomplished without writing explicit or dedicated code. The data from external systems 19 or from new models 23 can be read, modified, and deleted by users using the REST interface 29 and governance structure of repository 15.

The foregoing discusses how the model manager 25 is used to define and configure data, workflows, security and events. Next is described the system 100 run time environment.

Both the repository 15 management logic and any custom logic added to model manager 25 is executed in a distributed execution environment. In a preferred embodiment, the repository 15 run time environment is formed of a distributed event engine 41 and one or more agents 31. Agents 31 are empty "containers" that can execute any workflow managed by the model manager 25.

Generally, an agent 31, through distributed event engine 41, communicates with repository 15 using the REST interface 29. An agent 31 pings or otherwise communicates with the model manager 25 to see whether there are workflows to be executed. If there are, then an appropriate workflow (in code binaries) is downloaded from the model manager 25 and executed. The fact that an agent 31 initiates the communication with repository 15 greatly simplifies the installation of agents 31 across network segments and across firewalls. Upgrading the software that is executed by an agent 31 becomes a non-issue, as an agent 31 is logically an empty container that can only execute workflows (code binaries) downloaded from the model manager 25.

In some embodiments, version checking on the downloaded binaries using known technology may be utilized by agents 31. Other techniques common in the art for determining that the code binaries at the agent 31 end are up-to-date relative to the code binaries at the model manager 25 end are suitable.

The high level operation of invention system 100 is as follows. First a user submits a query 11 to a target relational model 19 via repository 15. The target relational model 19 may be one of many databases 19. In response, the repository 15 intercepts the input query 11 and identifies the submitting user. The user name can be provided as additional information in the query 11 in order to support delegation.

Next, repository 15 parses the query 11 and identifies which database objects or entities are to be accessed by the query 11. The repository 15 looks up in the MetaModel 13 the security information of the database entities to be accessed and resolves any group memberships stored in the authorization store (i.e. LDAP) 17. As a result, the repository 15 either allows or disallows access to the database objects/entities before even reaching the database 19.

For allowed access, the repository 15 modifies the query before it is submitted to the relational model 19 such that the data objects for which the user is unauthorized to access are filtered out, for example using a SQL where clause. A modified query applied to relational model 19 results.

In response to a triggering event, e.g., creation, modification or deletion of entities in data model 19, distributed event engine 41 determines which operations to execute and which agents 31 to employ to process the operations.

Distributed event engine 41 looks up, in models 23 and metamodel 13, stored definitions of operations per events. In this way, the event operations are predefined in and by models 23. Example event operations include filters, event scheduling (by absolute time, relative time or recurrent interval), a dynamic menu to an end user's application, and others.

Distributed event engine 41 may annotate the operations with certain skills and may inject credentials at runtime. This filters the operations to agents 31 having qualifying skills and network credentials. As a result, system 100 can load balance the work across agents 31 and with the injected credentials adds a level of flexibility in distributing work across the network.

In preferred embodiments, a skill is a qualifier that is associated to workflows and to agents 31. Any number and combination of required skills can be associated with a workflow. For example, a workflow will only run in a specific location or will require an environment that supports a specific API that the workflow is using. Any number or combination of skills can be supported by an agent 31. Any combination of workflow/agent skills determines which agent 31 will be used for the execution of a specific workflow.

Distributed event engine 41 posts or queues the operations ready for execution. Agents 31 obtain operations from the queue on a first come, first served basis, and execute. In particular, agents 31 download the code binaries of the operations to execute.

In a preferred embodiment, MetaModel 13 stores the security configuration information as data that qualify which data object(s) is accessible by certain user role/task. This information is also secured by the repository 15 itself (in models 23) making the invention security system 100 dynamically adjustable at runtime.

Relational Models 19

A plurality of relational data models 19 is hosted in a storage system that includes a query language capable of processing queries with conditional statements support. An example of (but not limited to) such a storage system is a relational database with support for primary and foreign keys, join statements and where clauses. The relational data models 19 in the plurality are generally unrelated to each other, disparate and non-centrally managed.

Each relational model 19 includes all of its relationships and entities in a standard machine readable format. This machine readable information (model metadata 13) includes a full description of all of the entities that are used to store data, including the type of information of the data stored, and the relationships between all the entities.

Figure 2:
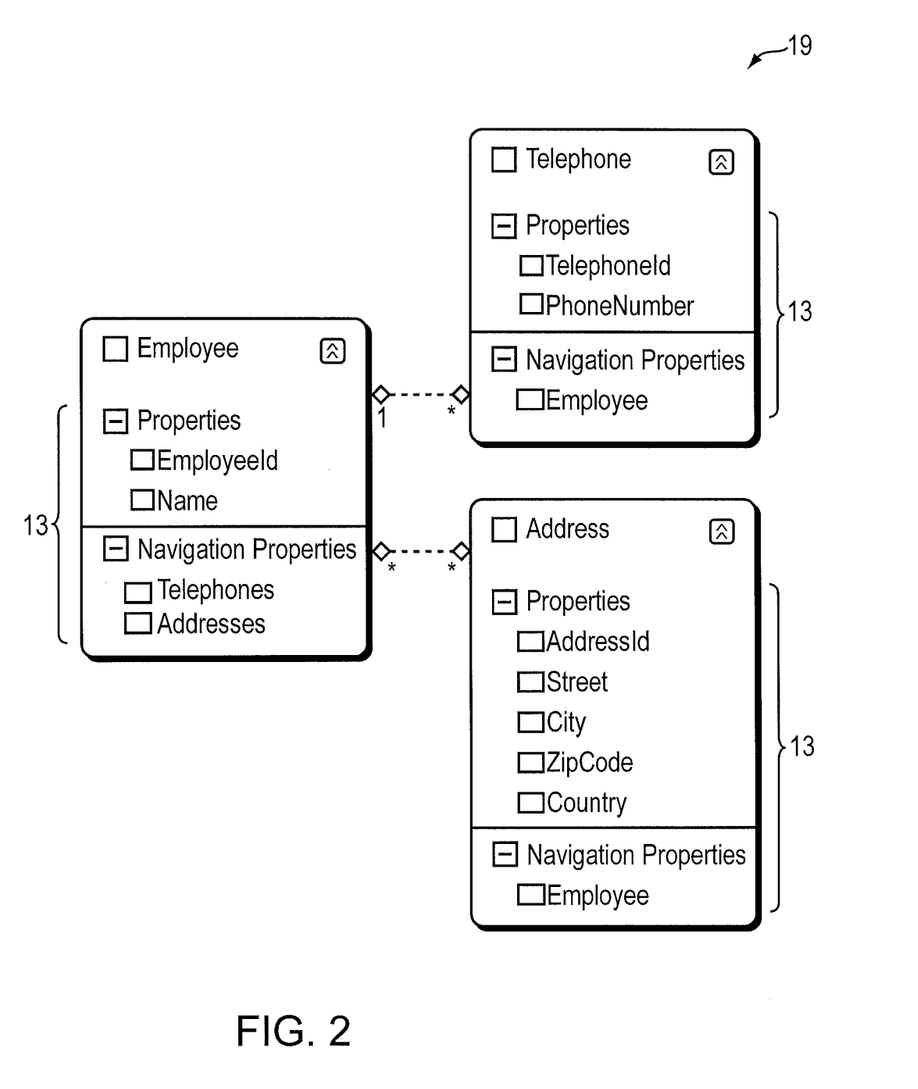
FIG. 2 is a schematic view of the relational data model and corresponding metadata (i.e., metamodel) in embodiments.

An example of a rational data model 19 and corresponding XML metadata 13 (machine readable) is provided in FIG. 2 and detailed as follows:

```
<model>
  <entities>
    <entity name="Address">
      <properties name="AddressId" key="true"/>
      <properties name="Street"/>
      <properties name="City"/>
      <properties name="ZipCode"/>
      <properties name="Country"/>
    </entity>
    <entity name="Employee">
      <properties name="EmployeeId" key="true"/>
      <properties name="Name"/>
    </entity>
```

```
    <entity name="Telephone">
      <properties name="TelephoneId" key="true"/>
      <properties name="PhoneNumber"/>
    </entity>
  </entities>
  <relationships>
    <relationship>
      <end name="Address" multiplicity="*"/>
      <end name="Employee" multiplicity="*"/>
    </relationship>
    <relationship>
      <end name="Telephone" multiplicity="*"/>
      <end name="Employee" multiplicity="1"/>
    </relationship>
  </relationships>
</model>
```

The meta model 13 data provides the data models of models 23.

Role Based Security System 17

The declarative role based security system 17 is preferably formed of two main subsystems: a data subsystem and a security runtime subsystem.

That Data subsystem is a relational model used to store security access rules of the target relational model 19. The rules set forth who has access by organization, groups of users, and the like roles, and what these roles can respectively see and do. This defines how to relate to the relational model 19 data and what database 19 rows to relate. The security system 17 uses hierarchical structures in order to maximize the expressiveness of the system and thus minimize repetition of information when representing complex relationships between the access control rules and different user roles of the target model 19.

The security runtime subsystem is a set of algorithms used to determine the access control rules that apply to a particular user, and filter data not accessible to (unauthorized for) that user. The security runtime intercepts any queries 11 to the storage system of the target relational model 19. It then modifies the queries such that unauthorized data (i.e., data not authorized to be accessible to the user) is filtered.

Figure 3:
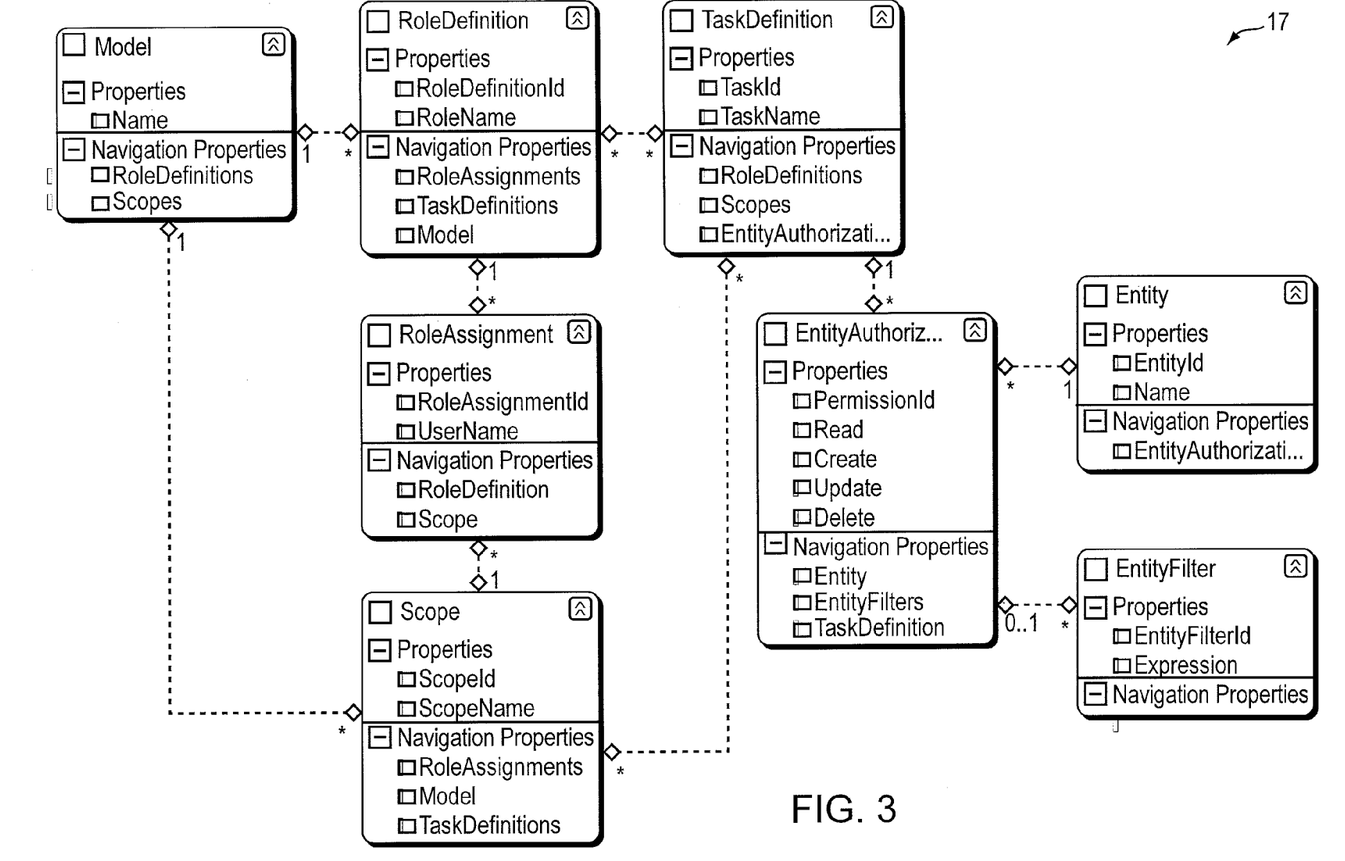
FIG. 3 is a schematic view of the role-based security information of the metamodel in embodiments.

In one embodiment, the role based security information 17 is stored using the relational model illustrated in FIG. 3. In FIG. 3, Model: represents a target relational model 19 to be secured and has declared definitions of data entities and relationships.

Entity: represents an entity or object in the target model 19.

EntityAuthorization: represents an access rule associated to an entity, for example read access to the entity.

EntityFilter: is a set of conditional statements over the data of a target entity and its relationships. For example "Employee.Addresses.City=London"

Scope: is a bit of information that can be used to group a set of entities in the target model 19. The data in a scope can be used to uniquely identify the entities that belong to that scope. For example, a scope could be the name of a city, such as London, then all of the addresses in London, employees who live in London and all London phone numbers can be uniquely identified as part of the scope.

RoleAssignment: represents the role of a user in a particular scope.

RoleDefinition: represents a role within the system, for example, users, administrators, visitors.

TaskDefinition: represents a set of tasks associated to a role.

Model manager 25 uses the foregoing as part of the security configuration of a model 23 stored in repository 15 and related to a target database/relational model 19. Then in accordance with model 23 definitions, model manager 25 generates code to produce a pertinent representation of target database 19 in REST or web service interface 29.

Distributed Event Engine 41

In embodiments of the invention system 100, the distributed event engine 41 comprises an event data subsystem 43, an event runtime subsystem 45, and one or more agents 31.

The event data subsystem 43 is a relational model used to store event definitions on the target relational model 19. It also contains the definitions of operations and filters.

The event runtime subsystem 45 is a set of algorithms used to determine which operations to execute when an target database 19 event occurs.

Each Agent 31 is a remote process executing respective operations scheduled by the event runtime subsystem 45. An agent 31 processes operations in an asynchronous manner. In some embodiments, there are a plurality of agents 31, each having common skills. Agents 31 obtain operations scheduled by the event runtime subsystem 45 on a first-come-first served basis. Where the agents 31 have a same set of skills, the invention system 100 can load balance the work across plural agents 31. As will be made clear below, the invention system 100 filters work (operations) by agent skill and agent credentials.

Figure 4:
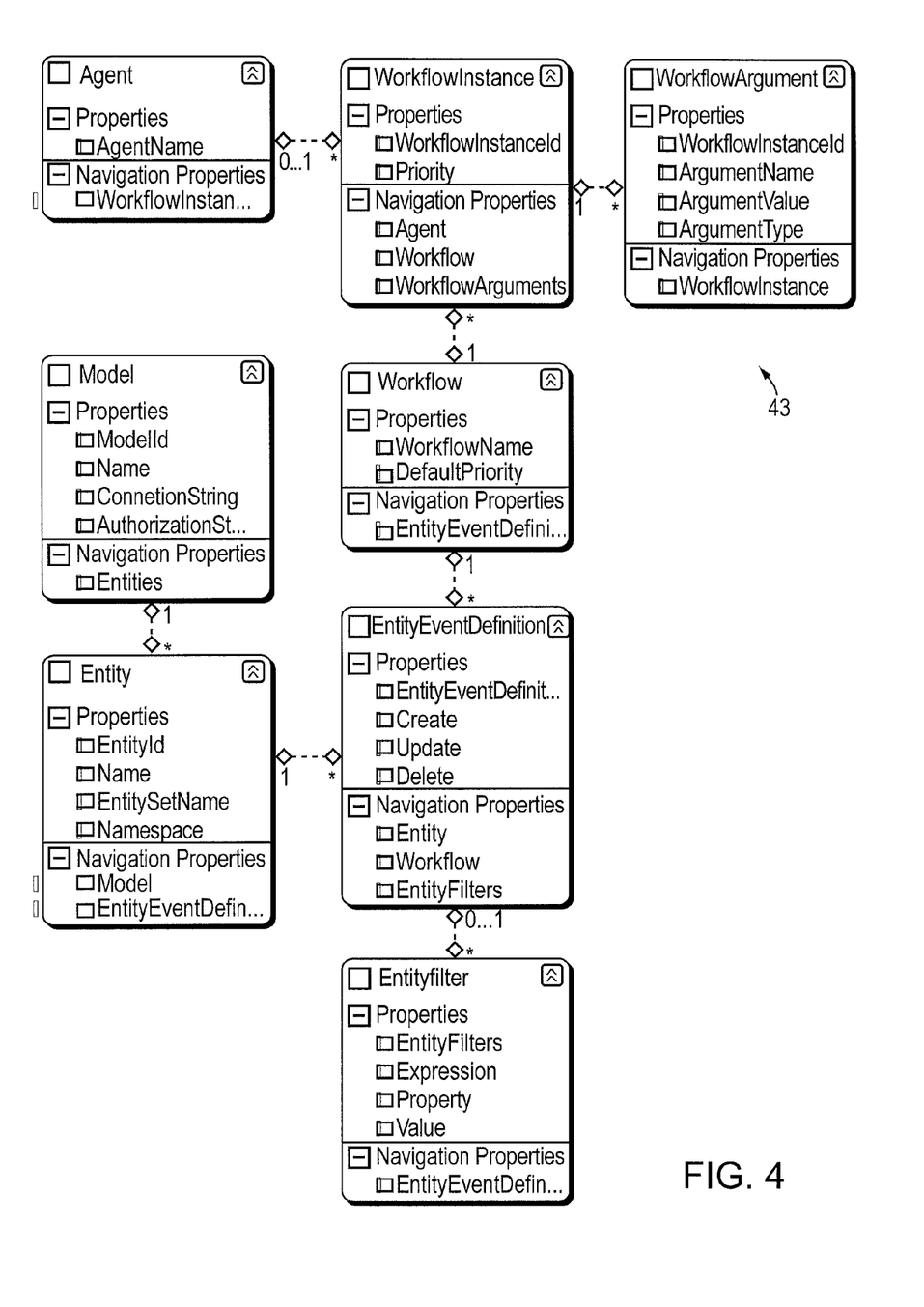
FIG. 4 is a schematic view of an event data subsystem in embodiments of the present invention.

The event data subsystem 43 relational model in one embodiment is illustrated in FIG. 4 and detailed as follows:

Model: represents a target relational model 19 to be secured and has declared definitions of data entities and their relationships.

Entity: represents an entity in the target database model 19.

EntityEventDefinition: represents an event associated to an operation over an entity, for example create a new instance of an entity.

EntityFilter: set of conditional statements over the data of a target entity and its relationships. For example "Employee.Name='Abe'"

Workflow: An operation or program to be executed when an entity event is triggered. Invention system 100 can annotate workflows with skills. This serves to filter WorkflowInstances to the agents 31 having respective skills.

WorkflowInstance: An instance of an operation to be executed in an agent 31.

WorkflowArgument: Arguments of an operation.

Agent: The name of a remote process capable of executing WorkflowInstances. Each agent 31 in the network can run under different network credentials, for example credentials may be specific to location the agent 31 is running in. The invention distributed event engine 41 in some embodiments can inject credentials into a WorkflowInstance assigned to an agent where the agent 31 has respective credentials. This provides a level of flexibility in distributing workflow.

For any given query 11, the process sequence by invention system 100 is as follows.

Step 1. To begin, a query 11 is submitted and in turn intercepted by the security runtime subsystem at 17 in the form of an expression tree. For example:

"INSERT INTO Employee (Name) VALUES ('Abe')"

Step 2. The security runtime subsystem of 17 parses the expression tree and identifies which entities in the target model 19 are part of the query 11. In the example:

Employee

Step 3. Next the security runtime subsystem of 17 builds a list of events associated to that entity from metadata definitions (including annotations of skills) stored in event data subsystem 43. In the example:

Workflow=NotifyUser
EntityEventDefinition=Employee (Create=true)
EntityFilter=Employee.Name='Abe'

Step 4. The security runtime subsystem of 17 builds an expression tree to filter the events using the following algorithm:

a. Generate an expression for each filter in the list generated in Step 3:
   i. Literal values are not modified.
   ii. If no expression is associated to the EntityAuthorization a constant "True" Boolean expression is generated.
b. All expressions are concatenated into a single expression using the AND expression.

Step 5. The security runtime subsystem of 17 evaluates the expression generated in Step 4. If the return value is true, the security runtime subsystem 17 schedules with event engine 41 (event runtime subsystem 45) an instance of the operation associated to the event. In doing so, the security runtime subsystem 17 passes as arguments a copy of the entity data as it looks at the time the event occurred. In turn, event runtime subsystem 45 compiles and automatically generates the desired code and injects that code (operations) into system 100. One or more pending operations managed by model manager 25 result.

Step 6. An agent 31 of event engine 41 reads the list of pending operations scheduled above, pulls down from repository 15 the code binaries for an operation and executes the code/operation. That is, per skill and credentials of the agent 31, the agent obtains an operation (WorkInstance) having matching or otherwise qualifying/acceptable skill (as annotated) and credentials (as injected) and executes that operation. If in operation, the agent 31 needs to make a data request, the agent generates a suitable query and system 100 processes as described above.

In this way, the invention system 100 automates low level code generation using a declarative approach. Definitions of business processes, triggering events and corresponding data model (target databases), and organizational rules for the data (actions and operations) are declared. In accordance with these declarations, event engine 41 compiles and generates low level code on the fly and interjects such code into the system 100 and computer network thereof.

Thus the present invention system 100 provides a declarative distributed event system for relational data models 19. Moreover, the present invention presents a resource and data centric, global computer network (i.e., Internet) scale architecture. Declarative, distributed events systems of the present invention are capable of operation across a computer network, and allow for adapting to, preserving and having no limits on canonical styles of target database. The declarative approach of Applicant's invention allows one to describe what the system should do as opposed to how the system should do it. Such advantages are not achieved by the prior art.

Figure 5:
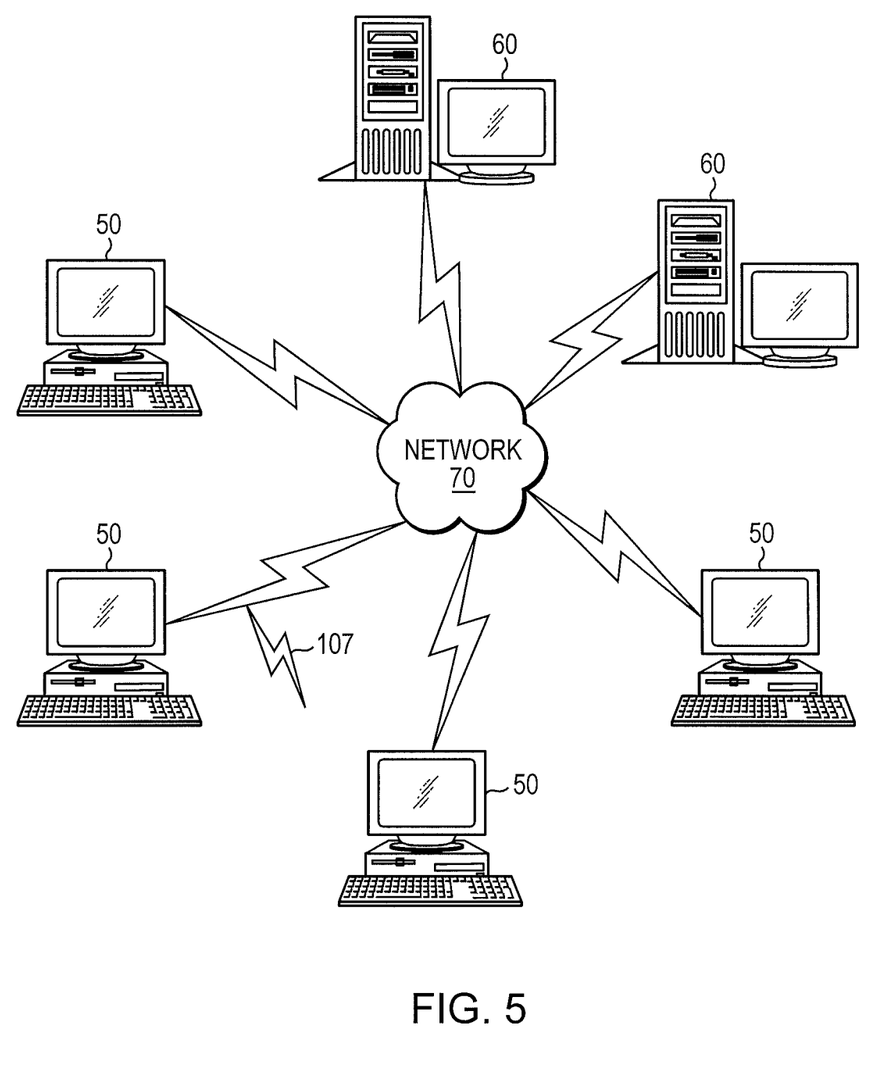
FIG. 5 is a schematic view of a computer network embodying the present invention.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
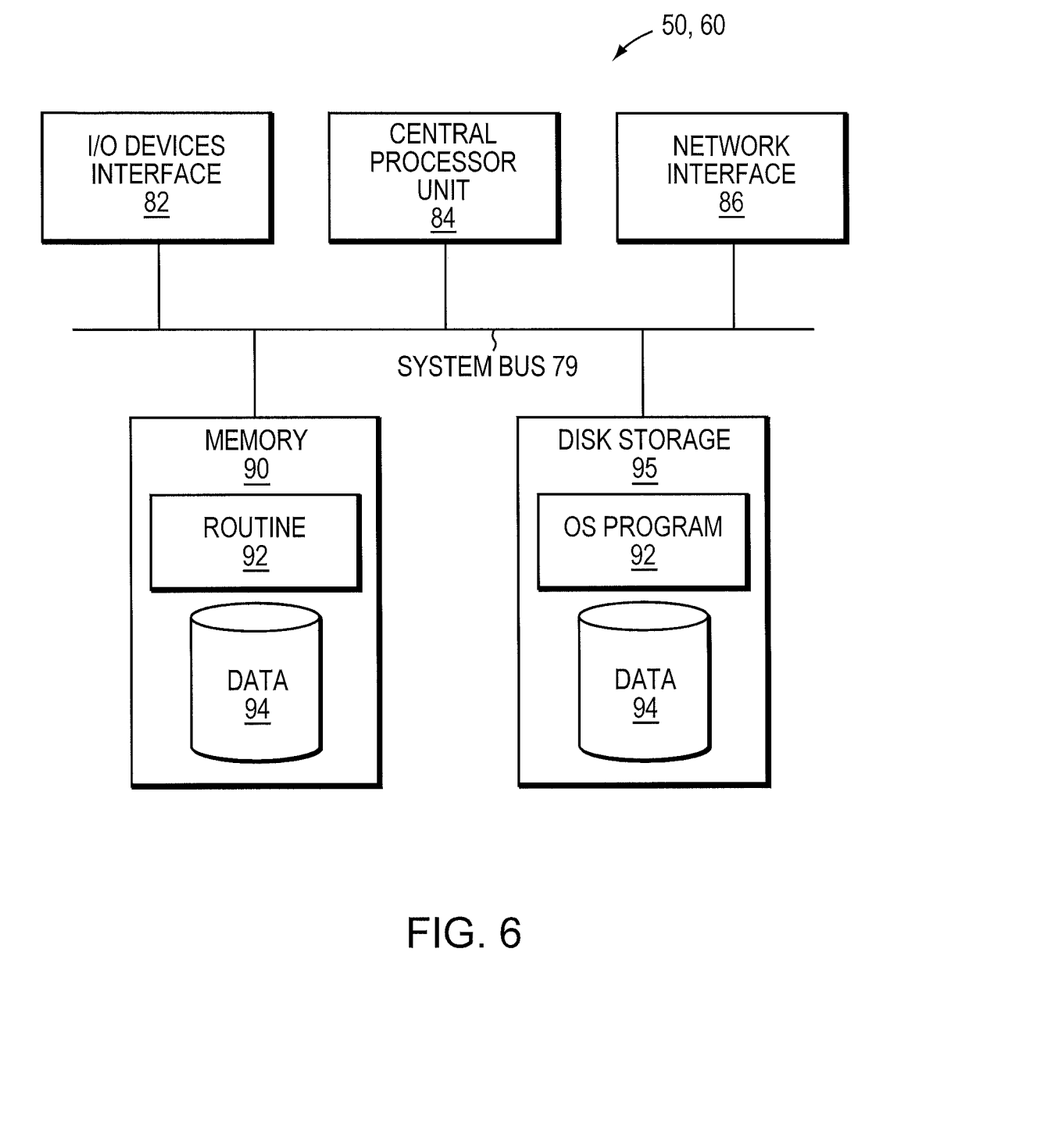
FIG. 6 is a block diagram of a computer node in the network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., security subsystem 17, model manager 25, distributed event engine 41 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:
1. A database method comprising:
providing an event data model of a target database, the target database being one of a plurality of databases;
per a subject entity in the target database, using the event data model to declare and define triggering events modifying the target database and respective corresponding workflows for each triggering event modifying the target database, wherein the workflows are executed on an integrated external system in response to a triggering event modifying the target database and are for execution by at least one agent according to respective skill and credential of the at least one agent;
storing, in a metamodel of the plurality of databases, security information that qualifies which data objects are accessible by certain roles of users providing a user query of the target database, wherein said one of said plurality of databases comprises said metamodel;
intercepting a user query of the target database, the user query identifying the subject entity;
automatically building an expression tree to filter out secure data for which the user does not have access rights based on said security information stored in said metamodel;
modifying the user query by appending the expression tree to the user query to filter out secure data for which the user does not have access rights based on said security information stored in said metamodel;
detecting occurrence of an event modifying the target database involving the subject entity in the target database;
based on the detected event modifying the target database, determining from the event data model corresponding workflows; and
distributing execution of the determined corresponding workflows on an integrated external system to at least one agent according to a skill and a credential of the at least one agent.

2. The method as claimed in claim 1 wherein the step of distributing employs one or more agents to execute respective workflows; and
respective code binaries of the workflows are downloaded to the one or more agents.

3. The method as claimed in claim 2 wherein each agent has a common set of skills; and
the method further comprises annotating the event data model with skills in a manner enabling respective filtering of agents for executing different workflows.

4. The method as claimed in claim 2 wherein different agents have respective different credentials; and
the step of distributing execution further comprises injecting credentials per workflows.

5. The method as claimed in claim 2 wherein said distributing workflows to agents is on a first come first served basis.

6. The method as claimed in claim 1 wherein the target database is a relational database.

7. The method as claimed in claim 1 wherein the step of detecting includes:
(a) intercepting a query of the target database;
(b) identifying the subject entity as part of the query; and (c) cross referencing event and corresponding workflows in the event data model for the subject entity as identified in the query.

8. The method as claimed in claim 1 wherein the target database is one or more databases.

9. The method as claimed in claim 1 wherein the event modifying the target database is selected from a list consisting of:
creation of the subject entity in the target database;
modification of the subject entity of the target database; and
deletion of the subject entity of the target database.

10. A computer database system comprising:
a processor;
a memory, said memory storing a plurality of software instructions configured to perform, when executed by the processor;
an event data model of a target database, for a subject entity in the target database, the event data model declaring and defining triggering events modifying the target database and corresponding workflows for each triggering event modifying the target database, wherein the target database is one of a plurality of databases, and wherein the workflows are executed on an integrated external system in response to a triggering event modifying the target database and are for execution by at least one agent according to respective skill and credential of the at least one agent;
a metamodel of the target database, the metamodel configured to store security information that qualifies which data entities are accessible by certain user roles of users providing a user query of the target database, wherein said one of said plurality of databases comprises said metamodel;
a security runtime subsystem executed by a processor, the security runtime subsystem (i) intercepting a user query of the target database, the user query identifying the subject entity, (ii) automatically building an expression tree to filter out secure data for which the user does not have access rights based on said security information stored in said metamodel, and (iii) modifying the user query by appending the expression tree to the user query to filter out secure data for which the user does not have access rights based on said security information stored in said metamodel;
an event engine executed by said processor, the event engine (i) detecting occurrence of an event modifying the target database involving the subject entity in the target database, (ii) based on the detected event modifying the target database, determining from the event data model corresponding workflows, and (iii) distributing execution of the determined corresponding workflows; and
one or more agents responsive to the event engine and executing the determined corresponding workflows on an integrated external system to at least one agent according to a skill and a credential of the at least one agent.

11. The computer database system as claimed in claim 10 wherein each agent has a common set of skills; and
the event data model is annotated with skills in a manner enabling respective filtering of agents for executing different workflows.

12. The computer database system as claimed in claim 10 wherein different agents have different credentials; and
the event engine enables credentials to be injected per determined corresponding workflows at runtime.

13. The computer database system as claimed in claim 10 wherein each agent obtains determined corresponding workflows to execute on a first come, first served basis.

14. The computer database system as claimed in claim 10 wherein the target database is one or more relational databases.

15. The computer database system as claimed in claim 10 wherein the event engine detecting occurrence of an event involving the subject entity includes a security runtime subsystem, the security runtime subsystem:
intercepting a query of the target database;
identifying the subject entity as part of the query; and
cross referencing event and corresponding workflows in the event data model for the subject entity as identified in the query.

16. The computer database system as claimed in claim 10 wherein to execute the determined corresponding workflows, the one or more agents download code binaries of the determined corresponding workflows.

17. A computer program product comprising:
a non-transitory computer readable storage medium having computer program code embodied therewith; and
the computer program code including code configured to:
store, in a metamodel of one of a plurality of databases, security information that qualifies which data objects are accessible by certain roles of users providing a user query of the target database, wherein said one of said plurality of databases comprises said metamodel;
provide an event data model of a target database in the plurality of databases, per a subject entity in the target database, the event data model declares and defines triggering events modifying the target database and corresponding workflows for each triggering event modifying the target database, wherein the workflows are executed on an integrated external system in response to a triggering event modifying the target database and are for execution by at least one agent according to respective skill and credential of the at least one agent;
intercept a user query of the target database, the user query identifying the subject entity;
automatically build an expression tree to filter out secure data for which the user does not have access rights based on said security information stored in said metamodel;
modify the user query by appending the expression tree to the user query to filter out secure data for which the user does not have access rights based on said security information stored in said metamodel;
detect occurrence of an event modifying the target database involving the subject entity in the target database by monitoring queries of the target database;
based on the detected event modifying the target database, determine from the event data model corresponding workflows; and
distribute execution of the determined corresponding workflows on an integrated external system to at least one agent according to a skill and a credential of the at least one agent.

18. The computer program product as claimed in claim 17 wherein the program code for distributing execution employs one or more agents to execute workflows, the agents downloading code binaries to execute the workflows.

19. The computer program product as claimed in claim 17 wherein the target database is one or more relational databases.

20. The computer program product as claimed in claim 17 wherein the databases in the plurality are unrelated to each other and are non-centrally managed.

\* \* \* \* \*